(No Model.)
W. JONES.
BOOT AND SHOE STRETCHER.
No. 319,585. Patented June 9, 1885.
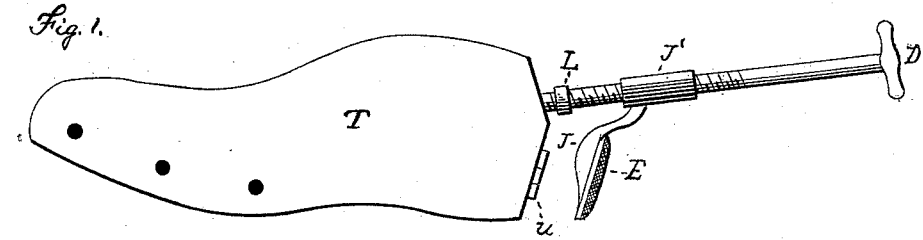
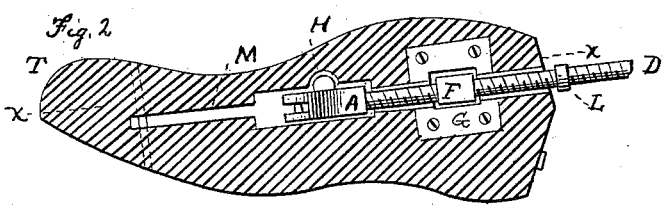
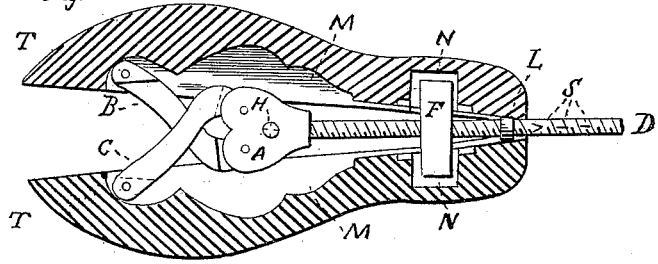
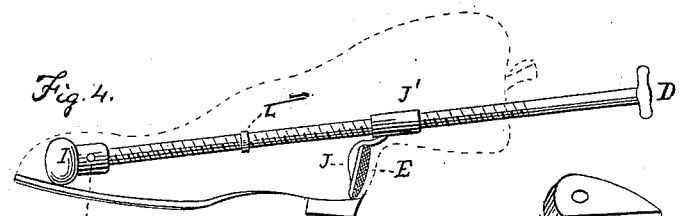
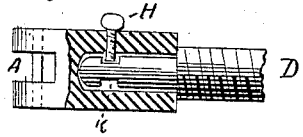
WITNESSES
Norris H. Clark
Charles H. Raeder
INVENTOR
Wiley Jones.

UNITED STATES PATENT OFFICE.

WILEY JONES, OF NORFOLK, VIRGINIA.

BOOT AND SHOE STRETCHER.

SPECIFICATION forming part of Letters Patent No. 319,585, dated June 9, 1885.

Application filed April 22, 1885. (No model.)

*To all whom it may concern:*

Be it known that I, WILEY JONES, a citizen of the United States, residing at Norfolk, in the county of Norfolk and State of Virginia, have invented a new and useful Improvement in Boot and Shoe Stretchers, of which the following is a specification.

My invention relates to improvements in boot and shoe stretchers, and its object is the production of an implement capable of stretching a boot or shoe in width and in length, by means of a divided last, preferably of wood, and one main operating-screw.

In the drawings which form a part of this specification, and serve to illustrate my invention, Figure 1 is a longitudinal outside view of the last, showing the heel-brace and part of the operating-screw. Fig. 2 is a longitudinal elevation of the inner side of one-half of the last. Fig. 3 is a horizontal section in the line $xx$ of Fig. 2. Fig. 4 shows the stretcher as used in lengthening the boot or shoe. Fig. 5 is a perspective of the links and swivel-nut. Fig. 6 is a vertical central section of the swivel-nut.

Similar letters refer to similar parts throughout the several views.

In the drawings aforesaid, A is a swivel-nut geared on the end of screw D by means of a thumb-screw, H, fitting into a slot, K, in the end of screw D, as shown in Fig. 6. In one shoulder of this nut is pinned the link B, and in the opposite shoulder is pinned the link C, as shown in Figs. 3 and 5. These links cross and interlap by a corresponding groove in each, thereby equipoising and balancing the pressure, so that thrust and wrenching upon the nut and its pins are avoided. Crossing the links gives the easy leverage necessary in operating a wooden last. Screw D passes through a screw-threaded nut, F, which has its bearings in the chambers N N in the sides of the last, each of which bearings is re-enforced by metallic face-plates G. To widen the shoe I turn screw D, thereby driving forward nut A and causing the crossed links B and C to expand the last, as shown in Fig. 3. To prevent nut A from being driven too far and thus breaking its pins, I fasten at the right point on screw D a stop-ring, L, abutting against nut F. I employ heel-brace J inside the shoe when I want to prevent the last from slipping back inside the shoe. On the threads of screw, which are made broad enough, are cut size-marks S, indicating whereabout on the screw heel-brace J is to be when put into any given size of shoe with the last. Thus, to stretch a No. 5, I move the brace to notch V on the screw. For a No. 6 I move it to the first notch above V, for a No. 7 to the second notch above, and so on.

T and T are the halves of the last. The pockets or grooves in these halves conform to nut A and its links, to leave the more wood in the last.

To stretch in length I withdraw screw D from nuts A and F, and fasten on its end a toe-piece, I. Then placing it and its heel-brace inside the shoe, I turn screw D, as shown in Fig. 4, thereby driving the toe-piece forward. There may be two sizes of the toe-piece. When I want to secure the toe-piece more firmly to screw D, I transfer screw H to the aperture R provided for it in the said toe-piece. That the toe-piece may not cut or tear the shoe the body of the said toe-piece has rounded corners, and is solid and nearly oviform, being larger at one end, so as to conform the stretched cavity to the great toe of the foot. The bulging back E of heel-brace J is to hold said brace from slipping out of the shoe, and the screw-threaded sleeve J' of the brace is to prevent the threads of screw D from cutting or soiling the back of the shoe.

Slot K and screw H may be used either in combination with an operating-screw that carries a swivel-nut at its end or with one that carries a wedge at its end.

Having thus described my invention, what I claim as mine, and desire to secure by Letters Patent, is—

1. The combination, in a shoe-stretcher having a divided wooden last hinged at the heel, of a swivel-nut, A, and the crossed and interlapped links B and C, as and for the purposes described.

2. The combination, in a shoe stretcher or lengthener having an operating-screw, of a slot, K, in the end of said screw, and a screw, H, carried by a swivel-nut, and gearing into the said slot, substantially as set forth and described.

3. The combination, in a shoe-stretcher, having a divided last, of a screw, D, provided with a stop-ring, L, and size-marks S, as and for the purposes described.

4. The combination, in a shoe-stretcher having a divided wooden last hinged at the heel, of a heel-brace, J, carried by the same operating-screw, and adapted to be operated simultaneously with the expanding last, substantially as described and set forth.

5. In a shoe-stretcher, the heel-brace J, having an integral sleeve, J', constructed as described, in combination with the expanding last and the toe-piece I, as set forth and described.

6. The combination, in a shoe-stretcher having a divided last, of the crossed links B and C, cut away and interlapped, as described, so as to balance the pressure, substantially as and for the purposes described.

7. In a shoe stretcher or lengthener, the detachable toe piece or pieces I, provided with the screw-threaded aperture R in its barrel, in combination with the screw D, provided with the annular groove K and thumb-screw H, as set forth and described.

8. The combination, in a shoe-stretcher having a divided wooden last, of chambers N N, face-plates G, and a screw-threaded nut, F, in combination with the screw D, provided with the size-marks S, as set forth and described.

9. In a shoe-stretcher, the halves T T of the last, provided with grooves M M, chambers N N, and face-plates G, in combination with screw D, heel-brace J, nuts F and A, and links B C, all substantially as and for the purposes shown and described.

WILEY JONES.

Witnesses:
RICHARD H. BAKER, Jr.,
WESTWOOD A. TODD.